3,822,996
WATER-SOLUBLE THIOUREAS TO INHIBIT OZONE FADING OF DYED POLYAMIDES
Robert Alden Lofquist and Peter Reginald Saunders, Richmond, Va., assignors to Allied Chemical Corporation, New York, N.Y.
No Drawing. Filed May 22, 1972, Ser. No. 255,628
Int. Cl. D06p 5/02
U.S. Cl. 8—165                                    6 Claims

ABSTRACT OF THE DISCLOSURE

When from about 0.2 percent to about 5 percent of water-soluble thioureas are coated on nylon fiber, improved dyefastness is achieved compared to an untreated dyed nylon fiber when this fiber is exposed to ozone.

BACKGROUND OF THE INVENTION

The object of this invention is to reduce or prevent the fading of dyed nylon fabrics, such as nylon carpets, caused by ozone.

Ozone is generally present in air at sea level at concentrations of only 1 to 5 parts per hundred million (p.p.h.m.). Only under conditions of heavy smog, where sunlight acts on a combination of unburned hydrocarbons from gasoline and oxides of nitrogen does the ozone concentration exceed these concentrations. However, even at the low ozone concentrations, if the humidity is high enough (e.g., over 75% R.H.) ozone fading occurs.

Ozone is a molecular form of oxygen which has three atoms of oxygen instead of the normal two atoms of oxygen per molecule. It is a very powerful oxidizing agent; and a strong electrophilic reagent, that is, it searches out and attacks electron pairs such as exist with carbon-carbon double bonds.

Dyes have a multiplicity of double bonds, and perhaps for this reason are very sensitive to ozone.

The dyes in nylon which are most seriously attacked are those which are mobile in the nylon, such as disperse dyes Cationic dyes are also susceptible. The most sensitive dyes are usually blue dyes having an anthraquinone nucleus although there is evidence that under high humidity and high ozone concentration, almost all dyes are affected by ozone.

Basic anthraquinone dyes, such as C.I. Basic Blue 47, are subject to ozone fading as shown in the Examples. Typical anthraquinone dyes are shown by U.S. 2,900,216. Analysis of C.I. Basic Blue 47 or Astrazon Blue 3RL has shown it is quaternized from the compound labeled 2 in the list of compounds on page 1 of U.S. 2,900,216. Thus, the structure would be:

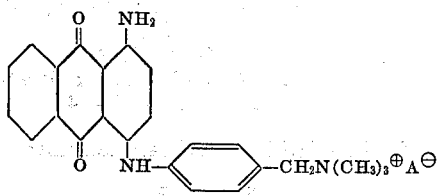

where A is an anion, such as Cl$^\ominus$. The 1963 Supplement of the Colour Index also indicates Astrazon Blue 3RL is an anthraquinone.

The structure of C.I. Disperse Blue 3 is shown in U.S. 3,716,328, column 1, line 45.

High humidity is necessary to cause noticeable ozone fading. Apparently moisture permits the dye to have sufficient mobility to diffuse to the surface of the yarn where the destruction of the dye occurs.

A number of chemicals have been called antiozonants in the literature which protect rubber from ozone. Examples are paraphenylenediamine derivatives, and dihydroquinoline derivatives. In nylon, however, these chemicals seriously discolor the yarn, especially after exposure to light, severely limiting the use of such materials.

SUMMARY OF THE INVENTION

A method and composition have been found for improving the fastness of dyes when exposed to ozone in polycarbonamide fibers. The method consists of exposing the fibers to ozone in the presence of a water-soluble thiourea coated on the fiber. The preferred material is unsubstituted thiourea. The thioureas of this invention have less than five carbon atoms and are incorporated in the dyebath or sprayed in solution onto a dyed carpet of nylon 6, or nylon 6,6. These thioureas partition in favor of the nylon and tend to remain with the fiber or yarn after scouring and/or shampooing, and compete with the dye for the ozone, thus decreasing the rate of destruction of the dye. The preferred range of thiourea compounds on the fabric is from about 0.2 to about 5% on weight of fiber.

The rate of fading of the dye in nylon fibers, particularly disperse or cationic dyes, is substantially reduced by the coating of these thioureas.

DESCRIPTION OF THE PREFERRED EMBODIMENTS

Some of the preferred embodiments of this invention are set forth in the following examples. The method of testing for ozone fading is similar to the AATCC Test 129–1968 set forth on page 334/15 of *The Journal of American Association of Textile Chemists and Colorists*, July 30, 1969, Volume 1, No. 16, in an article entitled, "A New Test Method for Ozone Fading at High Humidity," by Victor S. Salvin.

The method and the means of measuring the loss of dye consists in dyeing the yarn with a selected dye or dyes, exposing it to ozone at a concentration of 80 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a $\Delta E$ of 2.8, compared to the unexposed standard.

$\Delta E$ is a measure of the change of color between two samples, a smaller $\Delta E$ being a closer match, or less fading of one sample compared to the second sample.

This color difference, $\Delta E$ was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where $\Delta L$ is $L_1 - L_2$
$\Delta a$ is $a_1 - a_2$
$\Delta b$ is $b_1 - b_2$ and L, a, and b are readings on the Hunterlab Color Difference Meter. "L" is a 100 to 0 reading of white to black; "$a$" indicates redness when positive, gray when zero and green when negative; "$b$" indicates yellow when positive, gray when zero and blue when negative.

The following are examples of the subject additives and their behavior on being coated onto yarn, dyed and exposed to ozone, or on being coated on dyed sleeves and exposed to ozone.

Example I

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercial aqueous spin finish was drawn at a draw ratio of 2.9. The yarn had a Y cross-section with a 3.2 modification ratio and each filament had a denier of 15.

The yarn was chopped into 7-inch lengths, carded and spun into staple yarn having a cotton count of 2. The yarn was knitted into sleeves, and heat set by steam treating in an autoclave at 230° F. for five minutes followed by three 10-minute cycles of steam treatment at 260° F.

The sleeves were dyed to a moss green in a dye bath composed as follows:

0.3% Sevron Yellow 8GMF (Du Pont)
0.25% Astrazon Blue 3RL (Verona)
2.0% Hipochem PND-11
1.0% Hipochem CDL-60 and monosodium and/or disodium phosphate to adjust the pH to 7.0±0.2.

The sleeve was cut into sections about 5 inches long and each section was weighed. The sleeves were then held in the boiling water solutions shown below for 20 minutes. The sleeves were then removed from the solutions, dried and reweighed. The amount of material coated on the sleeves from each solution was based on the difference in weight between the coated and the uncoated sleeves, compared to the control.

The sleeves were then exposed to three cycles of ozone in an atmosphere of about 80 parts per hundred million of ozone at a temperature of 104° F., at a relative humidity of at least 95%. A cycle is that exposure which is completed when the internal nylon standard, dyed Olive I, has faded sufficiently to give a ΔE of 2.8. The measurement ΔE is discussed under "Description of the Preferred Embodiments."

The solutions, the amount of coating and the results of ozone exposure are listed as follows:

| | Percent pick-up | ΔE |
|---|---|---|
| (a)  Control—in 200 ml. of water | | 15.4 |
| (b)  1 gram dimethylethylthiourea in 200 ml. water | 3.46 | 0.1 |
| (c)  2 grams dimethylethylthiourea in 200 ml. water | 5.45 | 0.3 |
| (d)  1 gram trimethylthiourea in 200 ml. water | 3.35 | 0.5 |
| (e)  2 grams trimethylthiourea in 200 ml. water | 4.96 | 0.5 |

Dimethylethylthiourea and trimethylthiourea are available from R. T. Vanderbilt Company as Thiate B and Thiate E, respectively.

Example II

Polymer made from caprolactam having a formic acid viscosity of about 70, about 60 carboxyls and about 15 amines per million grams of polymer, was spun into yarn. The yarn, coated with a commercial aqueous spin finish, was drawn at a draw ratio of about 3.0. The yarn had a Y cross-section with a 3.0 modification ratio and each filament had a denier of 15.

The yarn was chopped into 7-inch lengths, carded and spun into staple yarn having a cotton count of 2. The yarn was knitted into sleeves, and heat set by treatment similar to that given the sleeves in Example I.

The sleeves were dyed to an Olive I shade, a tertiary shade which consists of 0.069% O.W.F. (on weight of fiber) Disperse Blue (CI 61505), such as Celliton Blue FFRN, 0.0807% O.W.F. Celliton Pink RF, and 0.465% O.W.F. Celliton Yellow GA. Disperse Blue 3 dye is especially sensitive to ozone.

The dyed sleeve was then exposed to an atmosphere containing about 80 pphm of ozone at a temperature of 104° F. at about 95% relative humidity for three fading cycles.

The results of this exposure were:

| | Percent pick-up | ΔE |
|---|---|---|
| (a)  0.5 gram thiourea in 200 ml. water | 0.92 | 0.5 |
| (b)  1.0 gram thiourea in 200 ml. water | 2.95 | 0.4 |
| (c)  2.0 grams thiourea in 200 ml. water | 3.89 | 0.7 |
| (d)  0.4 gram dimethylethylthiourea in 200 ml. water | 0.92 | 1.8 |
| (e)  1.5 grams dimethylethylthiourea in 200 ml. water | 2.97 | 0.6 |
| (f)  0.5 gram N-methylthiourea in 200 ml. water | 0.96 | 0.8 |
| (g)  1.0 gram N-methylthiourea in 200 ml. water | 1.80 | 0.5 |
| (h)  2.0 grams N-methylthiourea in 200 ml. water | 3.57 | 0.6 |
| (i)  Control—pure water | | 24.1 |

We claim:

1. The method of improving fastness of dyes when exposed to ozone in polycarbonamide fibers dyed with anthraquinone dyes consisting of
    coating said dyed fiber with a substance consisting essentially of a compound selected from the group consisting of thiourea and a saturated alkyl substituted thiourea having less than 5 carbon atoms so that from about 0.2 to about 5 percent on weight of fiber of said compound remains on said fiber
whereby said dyed fibers, when exposed to ozone have a decreased rate of destruction of the dye.

2. The method of claim 1 wherein the polycarbonamide is polycaprolactam.

3. The method of claim 1 wherein said thiourea is added to said yarn in the dye bath.

4. The method of claim 1 wherein said coating is applied by being sprayed in solution onto a dyed carpet.

5. The method of claim 1 wherein said anthraquinone dyes are dispersed dyes.

6. The method of claim 5 wherein said anthraquinone dyes are basic dyes.

References Cited

UNITED STATES PATENTS

| | | | |
|---|---|---|---|
| 1,985,248 | 12/1934 | Ellis et al. | 8—74 |
| 2,583,370 | 1/1952 | Goppel et al. | 260—769 |
| 3,024,218 | 3/1962 | Stevens | 260—45.9 |

OTHER REFERENCES

V. Salvin et al., Textile Research Journal, vol. XXV, No. 7, July 1955, pp. 571–585 (577).
V. Salvin, ADR, Jan. 6, 1964, pp. 33–41.
V. Salvin et al., ADR, May 12, 1952, pp. P297–304.
V. Salvin, ADR, Feb. 26, 1968, pp. 51–54.

THOMAS J. HERBERT, JR., Primary Examiner

U.S. Cl. X.R.

8—74